US006179393B1

(12) United States Patent
Stellwagen

(10) Patent No.: US 6,179,393 B1
(45) Date of Patent: Jan. 30, 2001

(54) DISTRIBUTING VALVE FOR LOAD-INDEPENDENT CONTROL OF A HYDRAULIC CONSUMER WITH REGARDS TO DIRECTION AND SPEED

(75) Inventor: Armin Stellwagen, Lohr (DE)

(73) Assignee: Mannesmann Rexroth AG, Lohr/Main (DE)

( * ) Notice: Under 35 U.S.C. 154(b), the term of this patent shall be extended for 0 days.

(21) Appl. No.: 09/319,794

(22) PCT Filed: Dec. 6, 1997

(86) PCT No.: PCT/EP97/06826

§ 371 Date: Jun. 9, 1999

§ 102(e) Date: Jun. 9, 1999

(87) PCT Pub. No.: WO98/26186

PCT Pub. Date: Jun. 18, 1998

(30) Foreign Application Priority Data

Dec. 13, 1996 (DE) ............................................. 196 51 967

(51) Int. Cl.[7] ........................................................ B60T 8/42
(52) U.S. Cl. ..................................... 303/115.4; 303/117.1
(58) Field of Search ............................. 303/115.4, 119.2, 303/119.1, 117.1, 116.1, 116.2; 137/901, 625.66

(56) References Cited

U.S. PATENT DOCUMENTS 3,186,424 6/1965 Peach et al. .

FOREIGN PATENT DOCUMENTS 2342498 2/1975 (DE) .
2600776 7/1976 (DE) .
2647140 4/1978 (DE) .
2649775 5/1978 (DE) .
3341641 5/1985 (DE) .
0638730 2/1995 (EP) .
2297370 8/1976 (FR) .

OTHER PUBLICATIONS brochure 9129 8557–02 (GB) from Voac Hydraulics AB, valve designated K170LS.

*Primary Examiner*—Robert J. Oberleitner
*Assistant Examiner*—Devon Kramer
(74) *Attorney, Agent, or Firm*—Martin A. Farber

(57) ABSTRACT

The invention relates to distributing valve for load-independent control of a hydraulic consumer with regard to direction and speed. Similar distributing valves known per se have a control valve (30) which can be axially displaced in a slide bore hole (11) of a valve housing (10). In a neutral position, said control valve (30) blocks off two consumer chambers (13, 15) from a feed chamber (14) and selectably connects one of the two consumer chambers (13, 15) to a feed chamber (14) and the other consumer chamber (15, 13) to a return chamber in two operating positions. In addition, two brake pistons (51, 52) are arranged in two opposite lying receiving areas (33, 34) of the control valve (30). Both pistons can be pressurized in the direction of an enlargement of the opening section of a flow path leading from one consumer chamber (13, 15) to a return chamber (12, 16) via the respective receiving area, said pistons being pressurized in the other consumer chamber (15, 13) in a direction opposite to that of a spring (53) placed in a spring chamber (12). According to the invention, a slide longitudinal bore hole (36) which can be connected to a load indicator channel (22) extends from one pressure chamber (58) on one brake piston (51, 52) to the other pressure chamber (58) on the other brake piston (51, 52), and can be connected, upon displacement of the control valve (30) from the neutral position, to one consumer chamber (13) or another consumer chamber (15) depending on the direction of displacement.

13 Claims, 2 Drawing Sheets

DISTRIBUTING VALVE FOR LOAD-INDEPENDENT CONTROL OF A HYDRAULIC CONSUMER WITH REGARDS TO DIRECTION AND SPEED

FIELD AND BACKGROUND OF THE INVENTION

The invention is based on a directional control valve which is suitable for the load-independent control of the direction and speed of a hydraulic load.

A directional control valve is disclosed by German Offenlegungsschrift 23 42 498. It has a control slide which is axially displaceable in a slide bore in a valve housing and, in a neutral position, shuts off two load chambers on the slide bore from a feed chamber and, in two operating positions on either side of the neutral position, selectively connects one of the two load chambers to a feed chamber and connects the respectively other load chamber to a return chamber. In each of two accommodation chambers, which are located opposite each other and are made in the control slide from the opposite ends thereof, there is arranged a brake piston, which opens a flow path between a load chamber and a return chamber in each case only to such an extent that the hydraulic load can no longer lead the amount of fluid flowing toward it, that is to say that no lack of filling is produced in the flow line between said hydraulic load and the other load chamber. For this purpose, the brake piston is acted on by a spring with the effect of reducing the opening cross section of the flow path, and is acted on by the pressure in the other load chamber with the effect of enlarging the opening cross section. For the application of pressure, the control slide has a longitudinal slide bore, which can be connected via a transverse bore to the other load chamber and which opens into a pressure chamber between the bottom of an accommodation chamber and the brake piston located in this accommodation chamber. The longitudinal bore runs eccentrically in the control slide. In order to apply pressure to the other brake piston, there is a further longitudinal slide bore running eccentrically in the control slide, and a further transverse bore.

In the directional control valve disclosed by German Offenlegungsschrift 23 42 498, two feed chambers run around the slide bore at a distance from each other. The control slide has two annular grooves which are spaced apart axially from each other and of which each is respectively used to connect one of the two feed chambers to a load chamber. In the piston collar between the two annular grooves, the control slide has two further, narrower annular grooves which are separated from each other by a narrow web. One longitudinal slide bore is connected to the one narrow annular groove by a first transverse bore, and the other longitudinal slide bore is connected to the other narrow annular groove by a second transverse bore. A load indicator channel, which in the neutral position of the control slide is covered by the narrow web between the two narrow annular grooves, opens into the slide bore. Depending on the direction in which the control slide is moved from the neutral position, the load indicator channel is opened toward one or the other annular groove, and hence the load pressure prevailing in the respective load chamber is indicated in the load indicator channel.

While the directional control valve according to German Offenlegungsschrift 23 42 498 has two feed chambers, and a load indicator channel opens into the slide bore between these two feed chambers, the brochure 9129 8557-02 (GB) from Voac Hydraulics AB discloses a directional control valve, designated K170LS, in which, in a slide bore, a return chamber, a load chamber, a single feed chamber, another load chamber and a further return chamber follow one another, and a load indicator channel opens into the slide bore laterally at a point, that is to say, as viewed from a load chamber, on the other side of the adjacent return chamber. Using such an arrangement, it is possible for the directional control valve to be shorter in the axial direction of the control slide than that from German Offenlegungsschrift 23 42 498. In the directional control valve according to the above-mentioned brochure, a longitudinal bore which is closed on both sides runs centrally through the control slide, and three transverse bores or transverse bore stars lead from said longitudinal bore to the outside of the control slide. In the neutral position of the control slide, a first transverse bore star is located at a short distance from a load chamber, between the latter and the feed chamber. The second transverse bore star is located at a short distance from the other load chamber, between the latter and the feed chamber. Finally, a third transverse bore opens into an annular groove on the outside of the control slide and, in the neutral position of the control slide, is located symmetrically in relation to the mouth of the load indicator channel and, in every position of the control slide, connects the longitudinal slide bore to the load indicator channel.

SUMMARY OF THE INVENTION

The invention is based on the object of further developing a directional control valve of the precharacterizing clause of claim 1, that is to say a directional control valve having brake pistons in the control slide, in such a way that it is of more simple construction and is cheaper to produce.

According to the invention, this object is achieved in the case of such a directional control valve having the features of the precharacterizing clause of claim 1 by the fact that a single longitudinal slide bore extends from the one pressure chamber in one brake piston to the other pressure chamber in the other brake piston, and by the fact that if the control slide is displaced from the neutral position, the longitudinal slide bore can be connected either to one load chamber or to the other load chamber, depending on the direction of displacement. As a result of the presence of only one longitudinal slide bore, which leads to both pressure chambers in both brake pistons, the control slide is simplified and its production is made cheaper. The invention is based on the surprising finding that the control of a hydraulic load is not influenced if, in addition to the brake piston which controls the opening cross section of the flow path between the one load chamber and a return chamber and is acted on by the pressure in the other load chamber, the other brake piston is also subjected to the pressure in the other load chamber. Although the other brake piston is lifted from the bottom of the accommodation bore, the other return chamber remains closed by the control slide in relation to the other load chamber.

In a directional control valve according to the invention, too, at one point to the side of all the working chambers, the load indicator channel is open toward the slide bore, with the effect of producing a short axial design. In order to make such an arrangement of the load indicator channel possible, one brake piston is provided with a longitudinal load indicator bore which is open with respect to the pressure chamber in front of one end of this brake piston and is closed with respect to the spring chamber in front of the other end of this brake piston, and via which the longitudinal slide bore is connected to the opening of the load indicator channel into the slide bore.

The connection between the longitudinal load indicator bore in one brake piston and the load indicator channel is expediently produced via a transverse bore in the brake piston and via a transverse bore in [lacuna] sleeve surrounding the brake piston and belonging to the control slide.

An axial and/or a peripheral offset between the two transverse bores is advantageously compensated for by an annular groove which is located between the brake piston and the sleeve of the control slide, preferably on the outside of the brake piston.

If two brake pistons are accommodated in the control slide, it is usual for these two brake pistons to be formed in the same way or at least very similarly, with the effect of a low diversity of parts. Each brake piston has an annular groove which is located in the flow path between the load chamber and the return chamber and on each side of which there is a piston collar. In a directional control valve according to the invention, in which one brake piston has a longitudinal load indicator bore, the piston collar on the side of the spring chamber can now reach a considerable length, in order to be able to produce the connection between the longitudinal load indicator bore and the load indicator channel. The other brake piston is also not made to be exactly the same length, at its piston collar on the side of the spring chamber, as the brake piston having the longitudinal load indicator bore. This avoids unnecessary lengthening of the control slide.

The spring chamber behind the brake piston having the longitudinal load indicator bore can be relieved to a return chamber via a channel running inside the brake piston. In principle, this is also possible in the other brake piston.

An exemplary embodiment of a directional control valve according to the invention is illustrated in the drawings. The invention will now be explained in more detail with reference to the two figures of these drawings, in which:

DETAILED DESCRIPTION OF THE PREFERRED EMBODIMENTS

Figure 1:
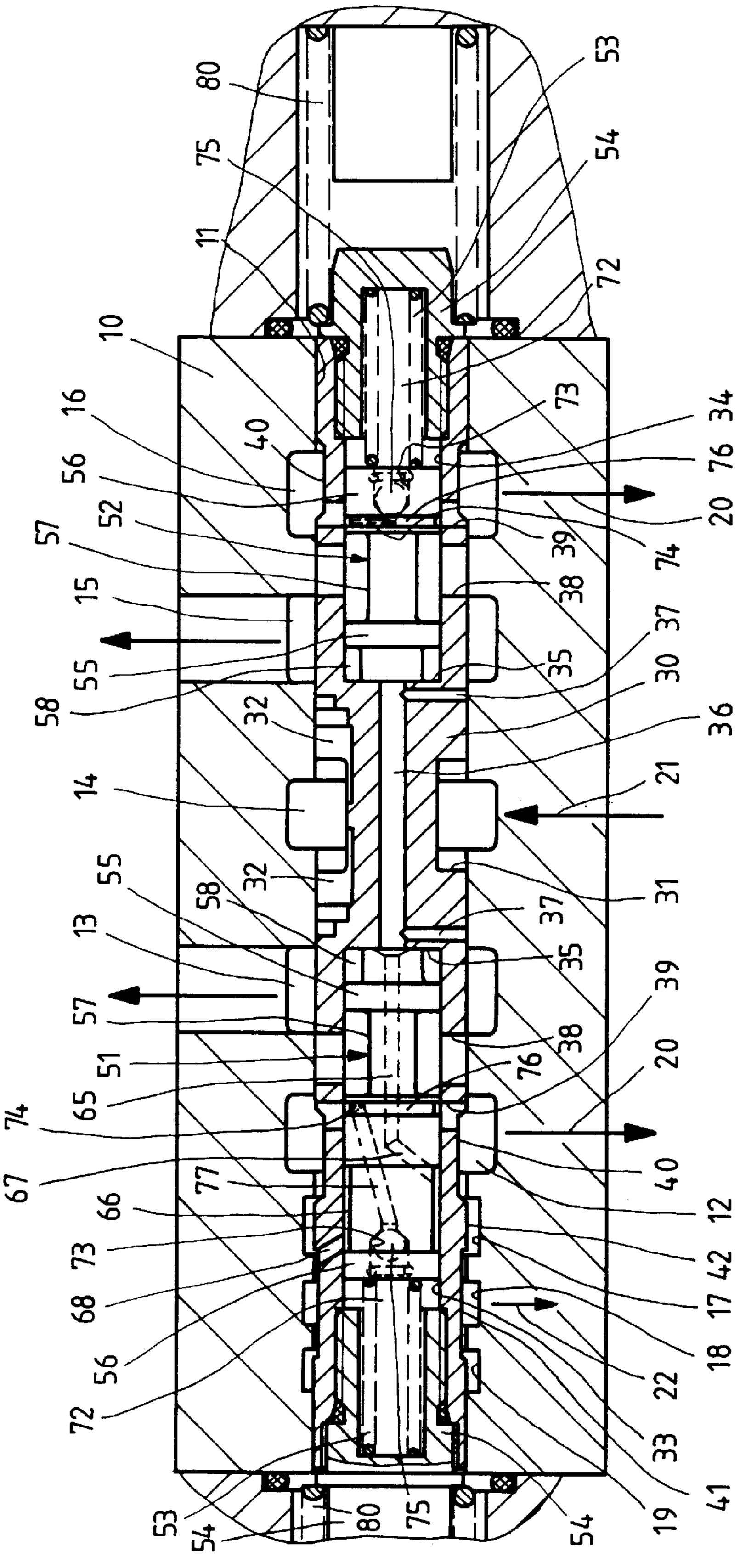
FIG. 1 shows a simplified illustration of a section through the exemplary embodiment, the section passing through the axis of the control slide.

According to FIG. 1, a valve housing 10 has extending through it a slide bore 11, which has a continuously constant diameter and around which various mutually spaced working chambers 12, 13, 14, 15 and 16 and control chambers 17, 18 and 19 run. The working chambers 12 and 16 which are the furthest removed from each other are return chambers, from each of which there originates a return channel 20, each of which is indicated by an arrow. The two return channels are led together in a generally known way outside the valve housing and can be connected to a tank. Located centrally between the two return chambers 12 and 16 is the feed chamber 14, to which pressure medium can be fed by a hydraulic pump via a pressure channel 21, which is likewise indicated in FIG. 1 by an arrow. Between the return chamber 12 and the feed chamber 14 there is a first load chamber 13 and between the return chamber 16 and the feed chamber 14 there is a second load chamber 15. Each load chamber can be connected via a load channel to a connection of a hydraulic load (not specifically illustrated).

The three control chambers 17, 18 and 19 are located to the side of the return chamber 12. The central control chamber 18 is designated as load indicator chamber here, and can be connected via a load indicator channel 22 to a control chamber in a load-sensing controller of a variable displacement pump or to a control chamber of a pressure compensator arranged in the bypass of a constant delivery pump, via which compensator some of the amount of pressure medium supplied by the constant delivery pump is fed back to the tank. The two control chambers 17 and 19 are each connected to a pressure limiting valve (not specifically illustrated).

A control slide 30 is axially movably guided in the slide bore 11 of the valve housing 10. Said control slide has a circumferential annular groove 31, which is relatively deep in the radial direction and is broader in the axial direction than the feed chamber 14, and which, in the neutral position of the control slide 30, shown in FIG. 1, is located in a central position in relation to the feed chamber 14. Fine control grooves 32, which are distributed over the circumference of the control slide 30, run axially toward both sides from the annular groove 31 and, in the neutral position of the control slide 30, in each case end at a short distance in front of the load chamber 13 and 15, respectively.

From each end of the control slide 30, an accommodation chamber 33 and 34, respectively, is made in the form of a blind bore in said control slide 30. The two bottoms 35 of the two accommodation chambers 33 and 34 are at a distance from each other which approximately corresponds to the clear distance, that is to say the distance of the axial boundary walls on the feed chamber side, of the load chambers 13 and 15 from each other. A longitudinal slide bore 36 goes through the control slide 30 from bottom 35 to bottom 35. Just before a bottom 35 in each case, a transverse bore 37 opens into the longitudinal slide bore 36, said bore originating from the outside of the control slide 30 in the region between two fine control grooves 32. In the neutral position of said control slide 30, both transverse bores 37 are closed by the wall of the slide bore 11.

At a distance from the bottom 35, two mutually diametrically opposite first radial bores 38 pass through the sleeve of the control slide 30, between the accommodation chamber 33 or 34 and the outside, and, in the neutral position of the control slide 11, are covered by material of the valve housing 10 which is located axially between the respective load chamber and the respective return chamber. At a greater distance from the bottom 35, two mutually diametrically opposite second radial bores 39 pass through the sleeve; their diameter is smaller than the diameter of the radial bores 38 and they open on the outside into a flat annular groove 40 in the control slide 30, said annular groove 40 extending in the axial direction to the outside from the radial bores 39 and ensuring that, if the control slide is displaced from the neutral position in one direction, the radial bores 39 are always open toward the return chamber 12 or 16. The annular groove 40 on the return chamber 12 is axially longer than the other annular groove 40 and, in the neutral position of the control slide, produces a connection between the control chamber 17 and the return chamber 12. At a distance from this longer annular groove 40, a further annular groove 41 is machined into the control slide 30 and, in the neutral position of the control slide, bridges all three control chambers 17, 18 and 19. The piston section 42 between the annular grooves 40 and 41 is accordingly axially shorter than the control chamber 17. In the neutral position of the control slide 30, there is therefore an open connection between the return chamber 12 and the three control chambers 17, 18 and 19, in which, in the neutral position of the control slide 30, the pressure present is accordingly the low pressure which prevails in the return channel 20.

There is a brake piston 51 in the accommodation chamber 33 of the control slide 30, and there is a brake piston 52 in the accommodation chamber 34. The two brake pistons are axially displaceable within the respective accommodation chamber, and are loaded in the direction of the bottom 35 of the respective accommodation chamber by a helical compression spring 53, which is supported on a closure screw 54 which closes the respective accommodation chamber. Each brake piston has, between two piston sections 55 and 56, an annular groove 57 via which the first radial bores 38 can be connected to the second radial bores 39 of the control slide 30. The distance of the annular groove 57 from that end of a brake piston which faces the bottom 35 of an accommodation chamber is identical in both brake pistons. The piston section 55 seals off a pressure chamber 58 between the bottom 35 of an accommodation chamber and the respective brake piston from the annular groove 57. The longitudinal slide bore 36 opens into both pressure chambers 58. The brake pistons 51 and 52 can therefore be acted on by the pressure prevailing in the longitudinal slide bore 36, counter to the helical compression spring 53. A spiral depression, or one or more depressions which run radially, in the ends of the brake pistons ensure that the pressure can act on a brake piston even if the latter is pressed by the helical compression spring 53 against the bottom 35 of an accommodation chamber.

The brake piston 52 is shorter than the brake piston 51. Accordingly, the accommodation chamber 34 is also shorter than the accommodation chamber 33. The brake piston 51 is longer than the brake piston 52 because it is used to produce a connection between the longitudinal slide bore 36 and the annular groove 41 running around the slide on the outside. For this purpose, it has at its center an axially extending blind bore 65, which is open at its end facing the bottom 35 of the accommodation chamber 30 and reaches as far as the piston section 56. This section 56 of the brake piston 51 is longer than the section 56 of the other brake piston 52, which necessitates the greater length of the brake piston 51. On the outside, a flat annular groove 66 runs around the piston section 56 and, in the rest position shown of the brake piston 51, in which the latter is supported on the bottom 35 of the accommodation chamber 33, is already located axially outside the second radial bores 39 of the control slide 30, that is to say cannot be connected to the return chamber 12 by the radial bores 39. A connection between the annular groove 66 and the blind bore 65 is produced by an oblique bore 67. On the other side, in any position of the brake piston 51, a connection is produced, via an oblique bore 68 in the control slide 30, between the annular groove 66 in said brake piston 51 and the annular groove 41 running around the control slide 30 on the outside. Thus, in any position of the brake piston 51, the longitudinal slide bore 36 is connected to the annular groove 41 via one pressure chamber 58, the blind bore 65, the oblique bore 67, the annular groove 66 and the oblique bore 68. The annular groove 66 on the brake piston 51 compensates for any axial and peripheral offset between the oblique bores 67 and 68.

Between a spring chamber 72, in which there is a helical compression spring 53, and a return chamber 12 or 16, compensation for the volume of pressure medium contained in a spring chamber can take place via bores in the respective brake piston 51 or 52. For this purpose, the brake piston 52 has an axial blind bore 73 which is open toward the spring chamber 72, and a number of radial bores 74, which originate from said blind bore 73, run in the piston section 56, open on the outside into a narrow annular groove 76 and, in any position of the brake piston 52, are open toward the second radial bores 39 of the control slide 30. Captured in the blind bore 73 is a ball 75 which, together with a seat (not specifically designated) in the blind bore 73, forms a nonreturn valve, which opens from the return chamber 16 toward the spring chamber 72. Thus, in the event of an enlargement of the spring chamber 72, that is to say in the event of a movement of the brake piston in the direction of the bottom 35 of the accommodation chamber 34, pressure medium can flow rapidly out of the return chamber 16 into the spring chamber 72. A flow of pressure medium from the spring chamber 72 to the return chamber 16 is possible, bypassing the nonreturn valve, via a restrictor (not specifically designated). Said restrictor may be formed, for example, by a notch in the seat for the ball 75. The movement of the brake piston 52 in the direction of the closure screw 54 is therefore damped.

The same is also true for a movement of the brake piston 51 in the direction of the corresponding closure screw 54. In order to connect the spring chamber 72 to the return chamber 12, the brake piston 51 has the same short axial and central blind bore 73 as the brake piston 52, and a radial bore 74 which, just before the annular groove 57, opens on the outside into a narrow annular groove 76 on the brake piston and on the inside ends in front of the blind bore 65. An oblique bore 77 runs between the bores 73 and 74. Once again, a ball 75 is captured in the bore 73 and is part of a nonreturn valve, which opens toward the spring chamber 72. A restrictor is once more formed by a notch in the seat of the nonreturn valve.

Each of the two control chambers 17 and 19 is connected to a pressure limiting valve (not specifically illustrated). The two pressure limiting valves limit the pressure in these control chambers and, for this purpose, can be set to different maximum pressures.

The control slide 30 is centered in the neutral position with the aid of two springs 80, and can be displaced hydraulically in one direction or the other.

Figure 2:
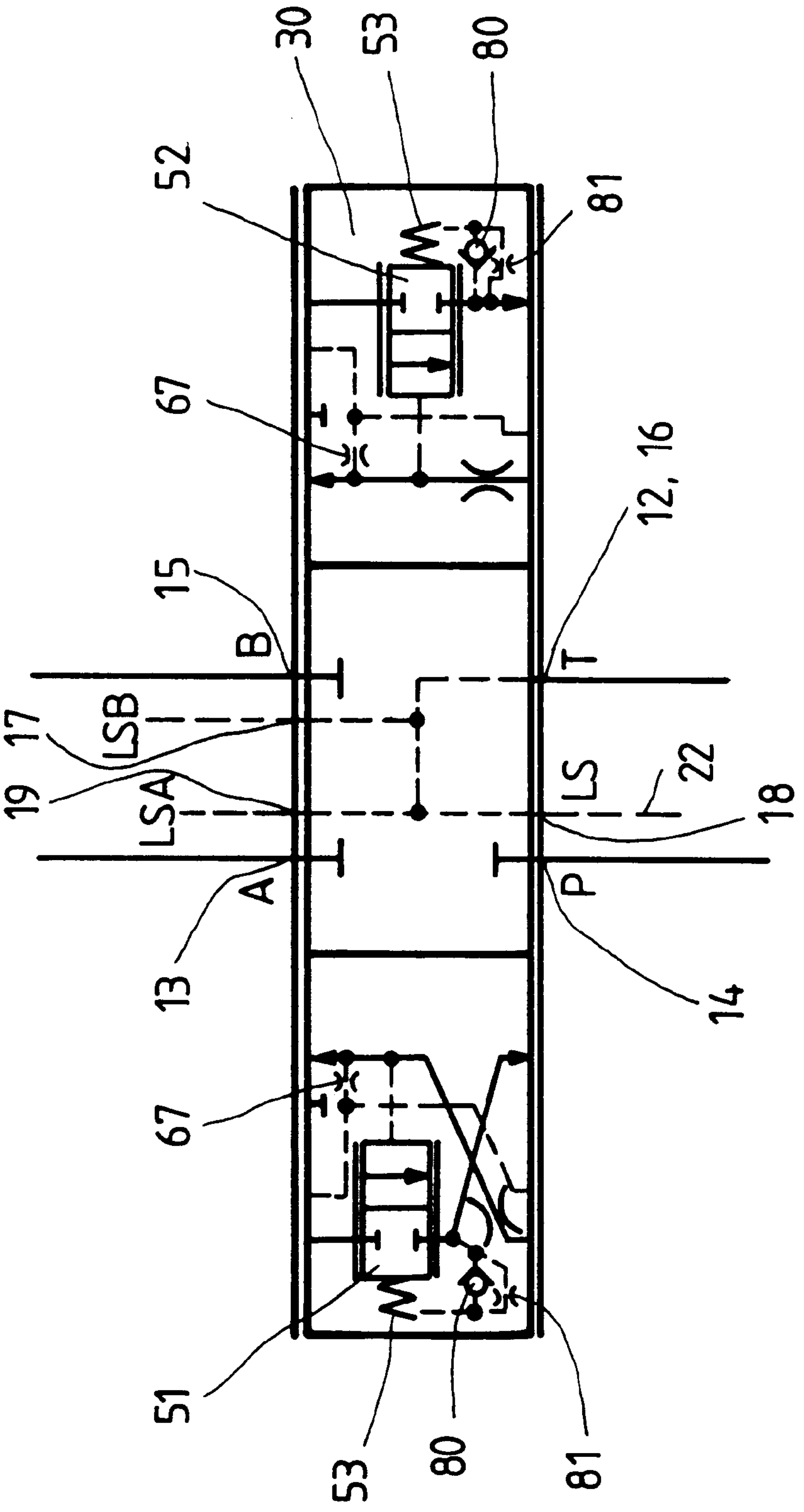
FIG. 2 shows a circuit diagram of the exemplary embodiment.

In the circuit diagram according to FIG. 2, the usual letter designations A, B, P and T are also indicated for the working chambers 12, 13, 14, 15 and 16. The designation LS is also used for the control chamber 18. Finally, the control chambers 17 and 19 also bear the designation LSB and LSA, respectively. The nonreturn valve in the connection between a return chamber 12 or 16 and a spring chamber 72 bears the reference number 80, the parallel-connected restrictor bears the reference number 81. Inserted between the load indicator channel 22 and the respective main flow path in an operating position of the control slide 30 is a restrictor, which is provided with the reference number 67, that is to say is formed by the corresponding transverse bore in the brake piston 51.

In the shown neutral position of the control slide 30, all the working chambers are shut off from one another. The transverse bores 37, the longitudinal slide bore 36, the pressure chambers 58, the blind bore 65, the oblique bore 67, the annular groove 66, the transverse bore 68 and the three control chambers 17, 18 and 19 are relieved of pressure toward the return chamber 12. The brake pistons 51 and 52 are pressed by the compression springs 53 against the bottom 35 of the respective accommodation chamber 33 and 34. Let it now be assumed that the control slide is displaced to the left in the view of FIG. 1. As a result, a metering orifice is opened between the feed chamber 14 and the load chamber 13, its opening cross section depending on the extent of the displacement of the control slide 30. One transverse bore 37 of the control slide 30 is also opened to the load chamber 13. While the load pressure of the respective hydraulic load is present in the load chamber 13, the pressure which prevails in the feed chamber 14 is the pump pressure, which, in the case of load-sensing control systems, within which the valve shown is used, is higher, by a specific difference of the order of 15 to 20 bar, than the load pressure of the driven hydraulic load or higher than the maximum load pressure of a plurality of hydraulic loads driven in parallel. Via the opened transverse bore 37 and the longitudinal slide bore 36, the load pressure prevailing in the load chamber 13 is also present in the pressure chambers 58, and presses the brake pistons against the closure screws 54. As a result, the brake piston 52 opens the connection between the load chamber 15 and the return chamber 16, the pressure medium flowing out of the load chamber 15, through the first radial bores 38 of the control slide 30, the annular groove 57 of the brake piston 52 and the second radial bores 39 of the control slide 30 to the return chamber 16. The movement of the brake piston 51 has no influence on the connection between the working chambers nor on the connection of the control chambers to one another. The load pressure is passed via the blind bore 65, the transverse bore 67 and the annular groove 66 of the brake piston 51, and, via the transverse bore 68 and the annular groove 41 in the control slide 30, to the control chamber 18 which, because of the displacement of the control slide 30, is separated by its piston section 42 from the control chamber 17 and from the return chamber 12, and is only still connected to the control chamber 19. From the control chamber 18, the load pressure can be indicated, via the load indicator channel 22, to the control valve of a variable displacement pump or to the pressure compensator connected in the bypass of a constant delivery pump.

The force of the compression springs 53 on the brake pistons 51 and 52 corresponds to a pressure of, for example, 5 bar in the pressure chambers 58. As soon as the pressure in the load chamber 13 falls below this value, because of any lead of the hydraulic load, the brake piston 52 moves in the direction toward the bottom 35 of its accommodation chamber 34 and reduces the opening cross section between the second radial bores 39 of the control slide 30 and its annular groove 57. In the process, it reduces the cross section to such an extent that in the load chamber 13 and therefore in the pressure chamber 58 a pressure is set which maintains equilibrium with the force of the spring 53. The pressure is therefore approximately 5 bar.

If the control slide 30 is displaced to the right from the neutral position, the load chamber 15 is connected to the feed chamber 14, and the load chamber 13 is connected via the brake piston 51 to the return chamber 12. The brake piston 51 then ensures that a minimum pressure is maintained in the load chamber 15. In addition, the other transverse bore 37 is then open toward the load chamber 15, so that the load pressure of the hydraulic load which is prevailing in said load chamber 15 can continue into the control chamber 18. The latter is then connected to the control chamber 17, both control chambers 17 and 18 being shut off from the return chamber 12 by the piston section 42.

What is claimed is:

1. A directional control valve for the load-independent control of the direction and speed of a hydraulic load, having a control slide (30) which can be displaced axially in a slide bore (11) in a valve housing (10), said control slide (30), in a neutral position, shutting off two load chambers (13, 15) from a feed chamber (14) and, in two operating positions, selectively connecting one of the two load chambers (13, 15) to a feed chamber (14) and connecting the respective other load chamber (15, 13) to a return chamber (12, 16), in which control slide (30), in each of two mutually opposite accommodation chambers (33, 34), there is arranged a brake piston (51, 52) which, with the effect of enlarging the opening cross section of a flow path leading from one load chamber (13, 15) to a return chamber (12, 16) via the respective accommodation chamber (33, 34), can be acted on by the pressure in the other load chamber (15, 13), and can be acted on in the opposite direction by a spring (53) accommodated in a spring chamber (72), and said control slide (30) having a longitudinal slide bore (36) which can be connected to the other load chamber (15, 13) and to a load indicator channel (22) in the valve housing (10) and opens into a pressure chamber (58) between the bottom (35) of an accommodation chamber (33, 34) and the brake piston (51, 52) in this accommodation chamber (33, 34), characterized by the fact that the longitudinal slide bore (36) extends from the one pressure chamber (58) in one brake piston (51, 52) to the other pressure chamber (58) in the other brake piston (52, 51), and by the fact that if the control slide (30) is displaced from the neutral position, the longitudinal slide bore (36) can be connected either to one load chamber (13) or to the other load chamber (15), depending on the direction of displacement.

2. The directional control valve as claimed in claim 1, characterized by the fact that, at one point to the side of all the working chambers (12, 13, 14, 15, 16), the load indicator channel (22) is open toward the slide bore (11), by the fact that one brake piston (51) is provided with a load indicator bore (65) which is open with respect to the pressure chamber (58) in front of one end of the brake piston (51) and is closed with respect to the spring chamber (72) in front of the other end of the brake piston (51), and via which the longitudinal slide bore (36) is connected to the opening (18) of the load indicator channel (22) into the slide bore (11).

3. The directional control valve as claimed in claim 2, characterized by the fact that the load indicator bore (65) in one brake piston (51) is connected to the load indicator channel (22) via a transverse bore (67) in the brake piston (51) and via a transverse bore (68) in a sleeve surrounding the brake piston (51) and belonging to the control slide (30).

4. The directional control valve as claimed in claim 3, characterized by the fact that in the region of the transverse bores (67, 68), between the brake piston (51) and the sleeve of the control slide (30), there is an annular groove (66) with which an axial and a peripheral offset of the transverse bores (67, 68) in relation to each other can be compensated for.

5. The directional control valve as claimed in claim 4, characterized by the fact that the annular groove (66) is located on the outside of the brake piston (51).

6. The directional control valve as claimed in claim 2, wherein the brake piston (51) having the load indicator bore (65) is longer on the spring chamber side than the other brake piston (52).

7. The directional control valve as claimed in claim 2, wherein the spring chamber (72) behind the brake piston (51) which has the load indicator bore (65) can be relieved to a return chamber (12) via a channel (73, 74, 77) running inside the brake piston (51).

8. The directional control valve as claimed in claim 3, wherein the brake piston (51) having the load indicator bore (65) is longer on the spring chamber side than the other brake piston (52).

9. The directional control valve as claimed in claim 3, wherein the spring chamber (72) behind the brake piston (51) which has the load indicator bore (65) can be relieved to a return chamber (12) via a channel (73, 74, 77) running inside the brake piston (51).

10. The directional control valve as claimed in claim 4, wherein the brake piston (51) having the load indicator bore (65) is longer on the spring chamber side than the other brake piston (52).

11. The directional control valve as claimed in claim 4, wherein the spring chamber (72) behind the brake piston (51) which has the load indicator bore (65) can be relieved to a return chamber (12) via a channel (73, 74, 77) running inside the brake piston (51).

12. The directional control valve as claimed in claim 5, wherein the brake piston (51) having the load indicator bore (65) is longer on the spring chamber side than the other brake piston (52).

13. The directional control valve as claimed in claim 5, wherein the spring chamber (72) behind the brake piston (51) which has the load indicator bore (65) can be relieved to a return chamber (12) via a channel (73, 74, 77) running inside the brake piston (51).

* * * * *